Jan. 30, 1962 A. WENZEL 3,018,718
BALER AND STRAW CUTTER FOR HARVESTER THRESHER
Filed Jan. 23, 1959
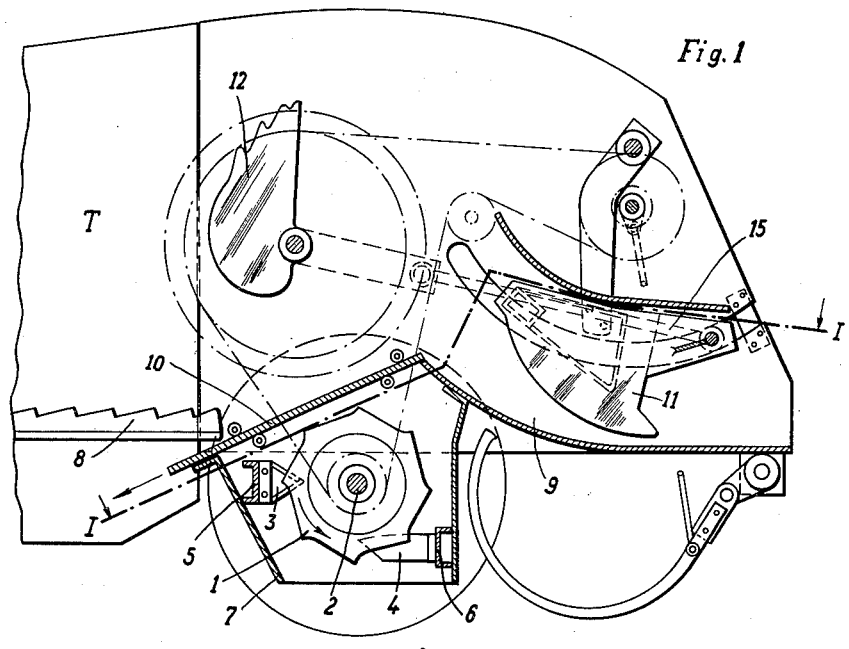
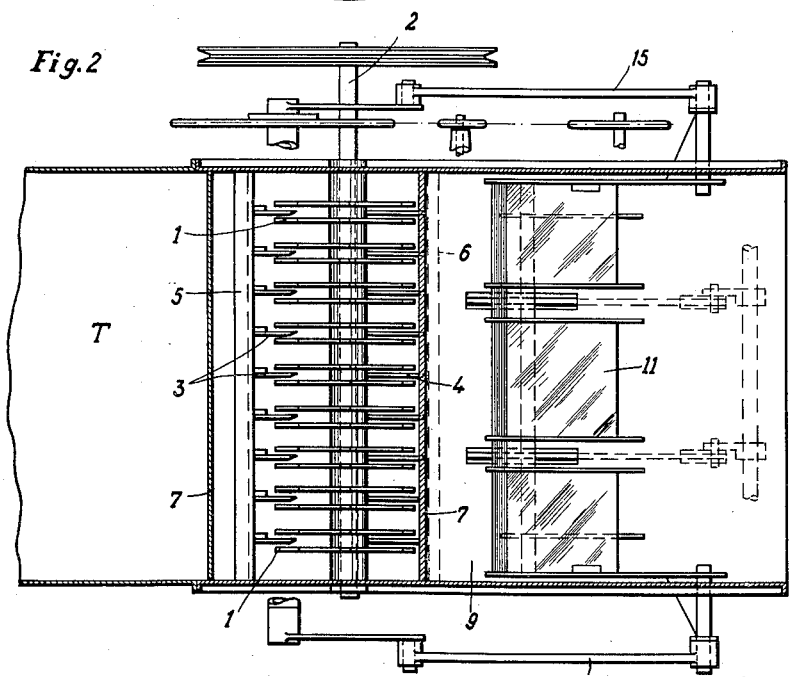
Inventor:
ALFRED WENZEL
by
Mestern & Kollin
ATTORNEYS

3,018,718
BALER AND STRAW CUTTER FOR HARVESTER THRESHER
Alfred Wenzel, Wolfenbuttel, Germany, assignor to Gebruder Welger, Wolfenbuttel, Germany
Filed Jan. 23, 1959, Ser. No. 788,666
Claims priority, application Germany Feb. 18, 1958
3 Claims. (Cl. 100—103)

The present invention relates to a baler and straw cutter for harvester threshers.

Prior to this invention, various embodiments of harvester threshers have been known in the art which are provided with a straw cutter at the outlet of the baling channel. This straw cutter is used for chopping up the straw which is not intended to be compressed into bales and for then spreading it along the ground to be subsequently plowed under. When the straw cutter is not to be used it is moved into an inoperative position away from the outlet of the baling channel or removed entirely from the latter.

The straw cutter in these machines usually consists of two sets of blades, one of which is stationary, while the other revolves relative thereto by being driven by a suitable drive shaft of the baler or of the thresher.

The loose straw coming from the shaker of the thresher is therefore intermittently pushed through the baling channel by the baling plunger even though the straw is not to be tied into bales, but is to be chopped up by the straw cutter and to be spread thereby on the ground. The straw is therefore compressed at least to a certain extent by the baling plunger which passes it intermittently into the straw cutter. Consequently, the straw cutter having to chop the precompressed straw is subjected to a heavy irregular and intermittent load and must therefore be made of a very solid construction. Furthermore, by being mounted at the extreme outer end of the machine, the straw cutter very detrimentally affects the center of gravity of the machine. This, in turn, requires a much more solid and heavy construction of the baling press and the associated apparatus connected thereto than would be required if the center of gravity of the machine was located at a more central point of the machine.

As already indicated above, if the straw is to be pressed into bales, the straw cutter of these prior machines must either be placed in a position in which it does not obstruct the outlet of the baling channel or it must be removed from the machine entirely. In the latter case, the straw cutter forms a separate unit which might be misplaced or be easily damaged.

Although the disadvantages of a straw cutter which is attached to the outlet of the baling chamber have been known for a long time, they had to be taken into account for want of any better construction.

It is an object of the present invention to provide a new arrangement of a straw cutter and baler for a harvester thresher which overcomes in a very simple manner all of the above-mentioned disadvantages of the prior designs thereof in which the baling press was built on the thresher and the straw cutter was attached to the baler in front of the outlet of the baling channel thereof. This is attained according to the invention by mounting the straw cutter in a parallel relation to the baling channel so that the straw which comes in a loose condition from the thresher may be selectively passed either through the baling chamber so as to be compressed therein and to be discharged from the machine in the form of bales, or through the straw cutter to be chopped up into chaff and spread upon the ground without passing through the baling chamber.

One of the numerous advantages attained by the inventive arrangement of the straw cutter in a parallel relation to the baling channel is that the straw cutter may thus be placed very closely to the wheel-axle of the thresher and that the center of gravity of the machine will be disposed more centrally thereof.

Since the straw is passed into the straw cutter in a loose rather than precompressed condition, and also in a substantially uniform flow, the straw cutter is not subjected to the high stresses and load variations as in the prior threshers. The straw cutter itself according to the invention may therefore be made of a lighter construction and it may be mounted on a much lighter frame structure. By providing the drive shaft of the baler in a suitable position, it is also possible to mount the straw cutter directly on the drive shaft of the baler at a point away from the path along which the straw is conveyed from the straw shaker of the thresher to a point in front of the baling plunger. This inventive arrangement also permits the straw cutter to be disposed on the machine frame at a point very close to the ground, preferably underneath a withdrawable bottom plate which forms the path along which the straw is conveyed from the shaker of the thresher to the baling channel.

Another feature of the invention consists in the fact that, while the straw is being passed through the straw cutter, all or a part of the movable elements of the baler may be disconnected from their respective driving means and may thus be stopped. Consequently, these elements do not have to be driven unnecessarily during the chopping operation and thus do not exert any load upon the machine at that time.

These and further details of the present invention will become more apparent from the following description which is to be read with reference to the accompanying drawings, in which—

FIGURE 1 shows a side view of a baler and straw cutter according to one preferred embodiment of the invention with one side wall of the machine removed therefrom to reveal the inside thereof; while FIGURE 2 shows a sectional view taken substantially on the line I—I of FIGURE 1.

Referring to the drawings, the revolving part 1 of the straw cutter is mounted directly on the drive shaft 2 of the baling press which, in turn, may be driven by any suitable shaft of the thresher, in a manner not particularly illustrated in the drawings.

The stationary cutting and stripping blades 3 and 4 are mounted on cross bars 5 and 6, respectively, of the machine frame, and the entire straw cutter is disposed within a housing 7 with a low center of gravity which has a bottom opening so that the chopped straw will be discharged and scattered upon the ground from a point only closely above it.

As illustrated in FIGURE 1, the straw cutter is mounted at a point below a bottom plate 10 which forms a part of the path on which the straw is conveyed from the shaker 8 of the thresher to the baling channel 9. Above this bottom plate 10, a rotary conveyor 12 sweeps along this path and pushes the straw, which has been loosely deposited by the shaker 8 upon the bottom plate 10, into the baling channel 9 in front of the baling plunger 11.

In order to permit the chopped straw to be spread out on the ground, this bottom plate 10 is designed so as to be withdrawable in the direction as indicated by an arrow in FIGURE 1. Instead of being conveyed to the baling chamber, the straw may then drop from the end of shaker 8 directly upon the blades of the straw cutter. In this case, the revolving conveyor 12 assists in feeding the straw to the straw cutter, while the reciprocating baling plunger 11 runs idle.

If the straw should thereafter again be compressed into bales, the bottom plate 10 is reinserted into the machine so that the straw cutter will again be shut off from the straw supply on the shaker 8.

If the revolving blades 1 of the straw cutter are to be driven at a speed different from the speed of the drive shaft 2 of the baling plunger, this shaft as well as the shaft of the thresher may be provided with additional pulleys, gears, or the like of a suitable diameter which may be connected by a belt or chain.

If the straw cutter is to be driven at a very high speed, it is inadvisable also to drive the reciprocating baling plunger 11. In this case, plunger 11 may be stopped, for example, by uncoupling its connecting rods or by disconnecting the baling unit entirely from the main drive by means of a jaw clutch. The revolving conveyor 12 should then be stopped in a position in which its blades do not interfere with the free flow of straw from the shaker 8 to the straw cutter. By means of such a clutch it is also possible to disconnect the straw cutter from the main drive whenever the straw is to be passed into the baling channel 9 for being compressed into bales.

If the revolving straw cutter 1 is mounted on the drive shaft 2 of the baler so as to revolve also while the straw is being compressed into bales, it will operate as a flywheel to overcome the dead-center positions of baling plunger 11.

The straw cutter according to the invention may be directly mounted on the frame of the baler or it may be designed as a separate unit which may be secured either to the baler or to the thresher at the end of the shaker, in which event the baler may also be removed from the machine when it is not required. Such a design of the straw cutter also permits it to be manufactured and sold as a separate unit and to be attached for example, to a baler to complement an existing thresher.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In the combination of a baler and a straw cutter for a harvester thresher having a baling chamber provided with a feed opening, a press plunger movable therein, there being a first guiding path extending between the end of a shaker and the feed opening of said baling chamber, a feed conveyor being arranged above said first guiding path and driven in synchronism with said plunger for conveying the straw from said shaker towards and into the feed opening of said baling chamber, there being a second guiding path for the straw delivered from the shaker by passing said baling chamber and opening directly towards the field, a cutter being rotatably mounted within said second guiding path and arranged beneath said first guiding path and lower than the feed opening of said baling chamber, and means for interrupting the first guiding path and providing direct access from said shaker to said second guiding path and towards the cutter mounted therein.

2. The combination as defined in claim 1, wherein said means is a bottom plate, said plate being removable for interrupting said first guiding path and giving the straw access to the straw cutter, the straw cutter being arranged relative to the conveying means in such a manner that after removing the bottom plate the conveying means may convey the straw directly into the straw cutter.

3. The combination as defined in claim 1, further provided with a housing surrounding said straw cutter and having a bottom provided with an opening, said cutter being arranged in such a manner that it may throw the chopped straw through said opening directly towards the ground.

References Cited in the file of this patent

FOREIGN PATENTS

| | | |
|---|---|---|
| 128,057 | Austria | May 10, 1932 |
| 751,593 | France | June 26, 1933 |
| 832,215 | Germany | Feb. 21, 1952 |
| 843,617 | Germany | July 10, 1952 |
| 937,444 | Germany | Jan. 5, 1956 |
| 1,006,195 | Germany | Apr. 11, 1957 |